US008296363B2

(12) United States Patent
Yamazoe

(10) Patent No.: US 8,296,363 B2
(45) Date of Patent: *Oct. 23, 2012

(54) DISCUSSION SUPPORT APPARATUS, DISCUSSION SUPPORT METHOD, AND COMPUTER-READABLE MEDIUM

(75) Inventor: Nobuyuki Yamazoe, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 250 days.

This patent is subject to a terminal disclaimer.

(21) Appl. No.: 12/621,182

(22) Filed: Nov. 18, 2009

(65) Prior Publication Data

US 2010/0235444 A1   Sep. 16, 2010

(30) Foreign Application Priority Data

Mar. 13, 2009   (JP) .................................. 2009-061641

(51) Int. Cl.
  *G06F 15/16* (2006.01)
(52) U.S. Cl. .......................... 709/204; 370/260; 709/205
(58) Field of Classification Search ................... 709/204, 709/261, 205, 217; 370/260
See application file for complete search history.

(56) References Cited

U.S. PATENT DOCUMENTS

| 5,812,126 | A | * | 9/1998 | Richardson et al. ........... 715/741 |
| 5,996,002 | A | | 11/1999 | Katsurabayashi et al. |
| 6,119,147 | A | * | 9/2000 | Toomey et al. ................ 709/204 |
| 6,417,819 | B1 | * | 7/2002 | Matsumoto et al. ........... 345/1.1 |
| 6,865,715 | B2 | | 3/2005 | Uchino et al. |
| 7,185,065 | B1 | | 2/2007 | Holtzman et al. |
| 7,519,672 | B2 | * | 4/2009 | Boss et al. .................... 709/206 |
| 7,549,119 | B2 | | 6/2009 | McCaffrey et al. |
| 7,836,050 | B2 | | 11/2010 | Jing et al. |
| 7,991,728 | B2 | | 8/2011 | Kaplan |
| 2002/0062368 | A1 | * | 5/2002 | Holtzman et al. ............ 709/224 |

(Continued)

FOREIGN PATENT DOCUMENTS

JP          09-106331 A       4/1997

(Continued)

OTHER PUBLICATIONS

Tuulos, et al., Combining Topic Models and Social Networks for Chat Data Mining., Web Intelligence, 2004. WI 2004. Proceedings, IEEE/WIC/ACM International Conference 2004, pp. 206-213.*

(Continued)

*Primary Examiner* — Wing Chan
*Assistant Examiner* — Kostas Katsikis
(74) *Attorney, Agent, or Firm* — Sughrue Mion, PLLC

(57) ABSTRACT

A discussion support apparatus includes a holding unit, an accepting unit and a generating unit. The holding unit holds pieces of discussion state information each indicating a state of a discussion at a corresponding one of points in time included in a period of time during which discussions are performed. The accepting unit accepts a discussion start operation indicating a start of discussion on a topic for which discussion has been started. The generating unit generates, based on one or more of the pieces of discussion state information indicating states of discussions at points in time before a point in time when the accepting unit accepts a discussion start operation for a certain topic, topic-related information indicating at least one piece of discussion state information which is related to the certain topic and which is specified from among the one or more of the pieces of discussion state information.

12 Claims, 12 Drawing Sheets

U.S. PATENT DOCUMENTS

| | | | |
|---|---|---|---|
| 2005/0149621 A1* | 7/2005 | Kirkland et al. | 709/207 |
| 2005/0278613 A1* | 12/2005 | Morinaga et al. | 715/500 |
| 2006/0190445 A1* | 8/2006 | Risberg et al. | 707/3 |
| 2008/0005240 A1* | 1/2008 | Knighton et al. | 709/204 |
| 2008/0228881 A1* | 9/2008 | Reynolds et al. | 709/206 |
| 2010/0162135 A1 | 6/2010 | Wanas et al. | |
| 2010/0235764 A1 | 9/2010 | Yamazoe | |

FOREIGN PATENT DOCUMENTS

| | | |
|---|---|---|
| JP | 10-40058 A | 2/1998 |
| JP | 11-119959 A | 4/1999 |
| JP | 2000-122995 A | 4/2000 |
| JP | 2005-352613 A | 12/2005 |
| JP | 2006-146311 A | 6/2006 |
| JP | 2007-066018 | 3/2007 |
| JP | 2007-122504 A | 5/2007 |
| JP | 2008-158641 A | 7/2008 |
| JP | 2008-219142 A | 9/2008 |
| WO | WO 9821664 A1 * | 5/1998 |

OTHER PUBLICATIONS

Japanese Office Action, dated Apr. 5, 2011, issued in Application No. 2009-061641.

Katashi Nagao; "Discussion Mining: Knowledge Discovery from Face-to-Face Meeting," Proceedings of the second spoken document processing workshop, Japan, Toyohashi University of Technology Media Science Research Center, Mar. 1, 2008, p. 41-50.

Notification of Reason for Refusal dated Nov. 9, 2010, issued in corresponding Japanese Patent Application No. 2009-061641.

Japanese Office Action issued on Jan. 18, 2011 in Japanese Patent Application No. 2009-061640.

U.S. Office Action issued on Feb. 17, 2012 in U.S. Appl. No. 12/621,138.

* cited by examiner

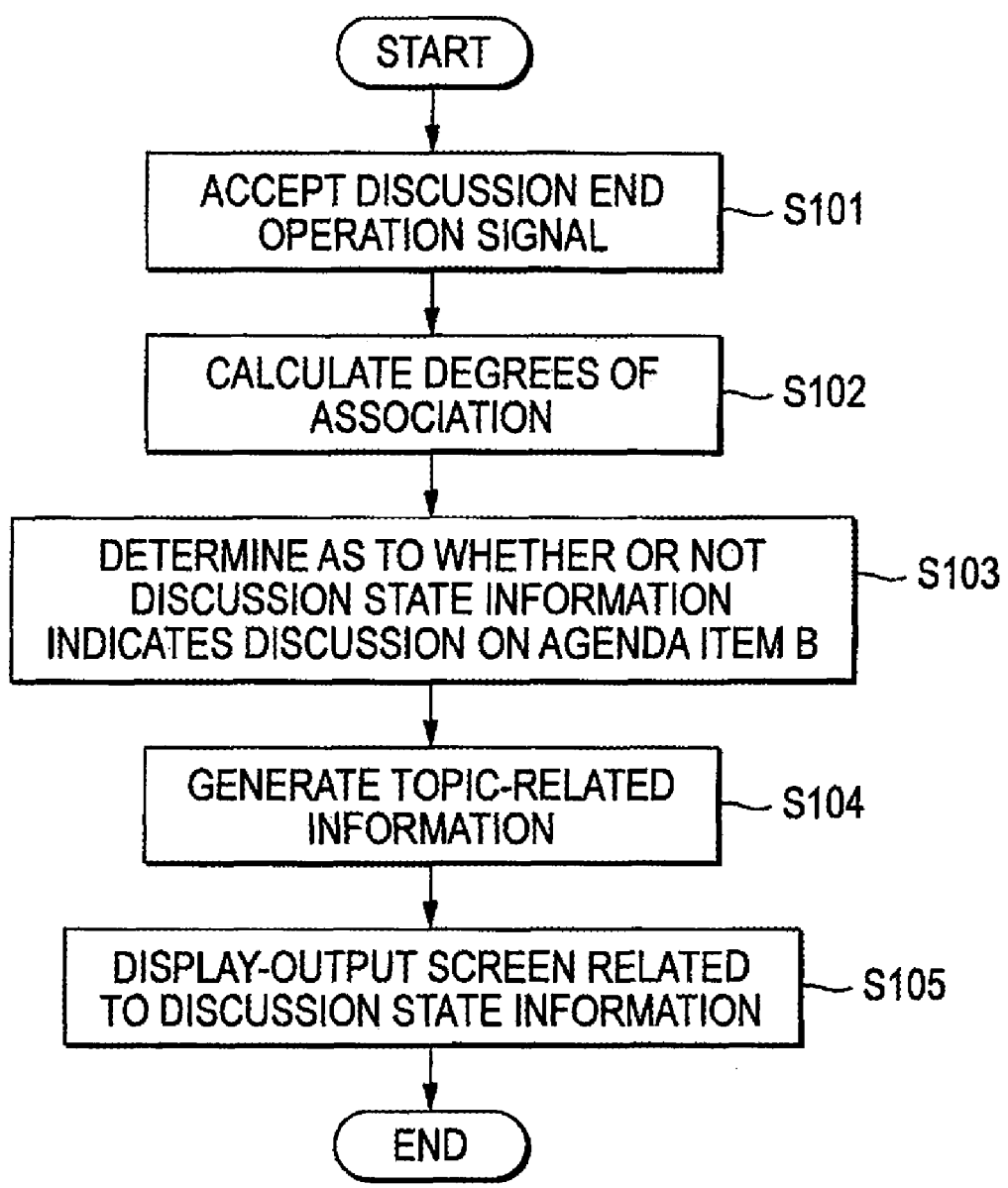

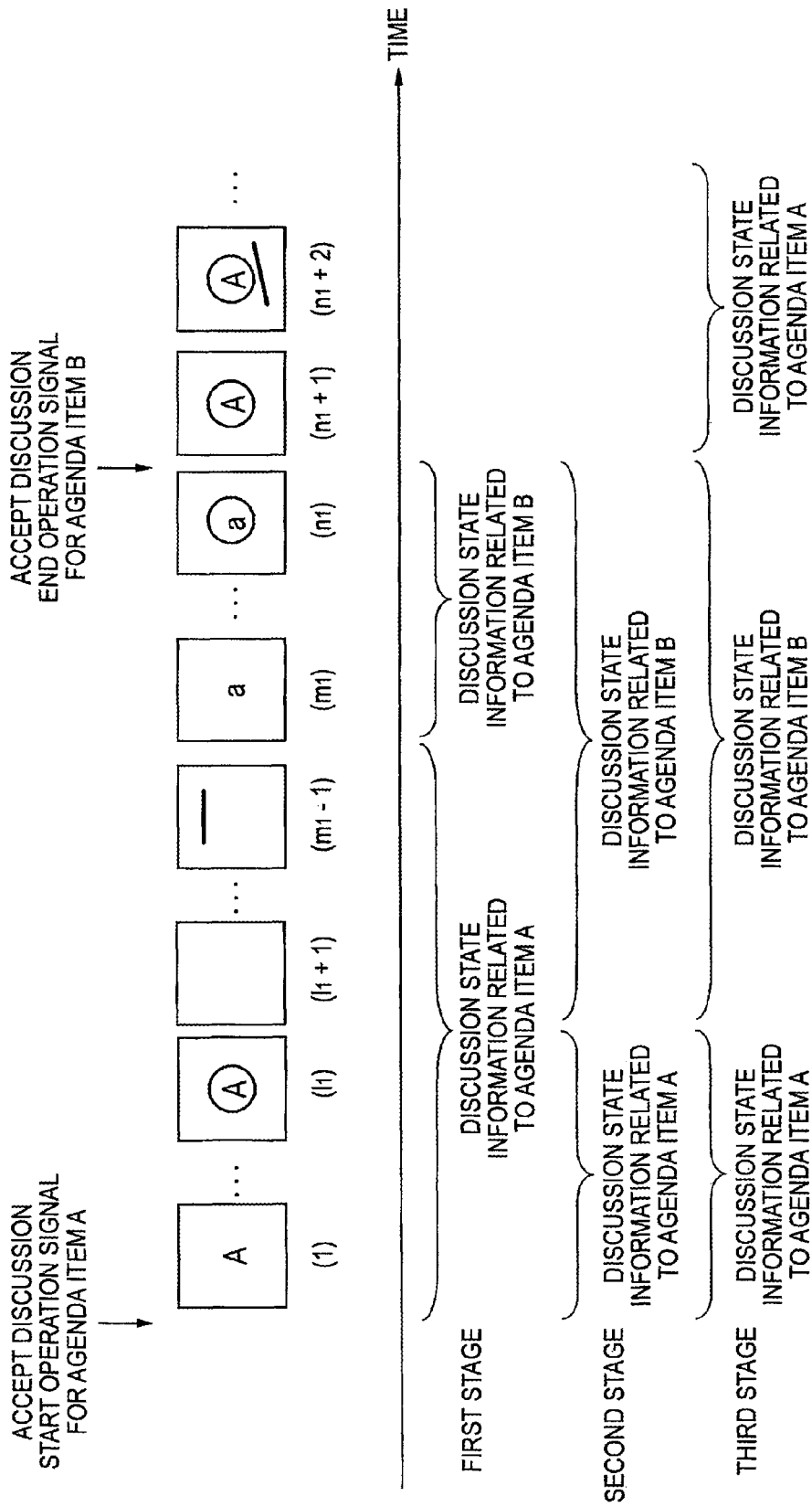

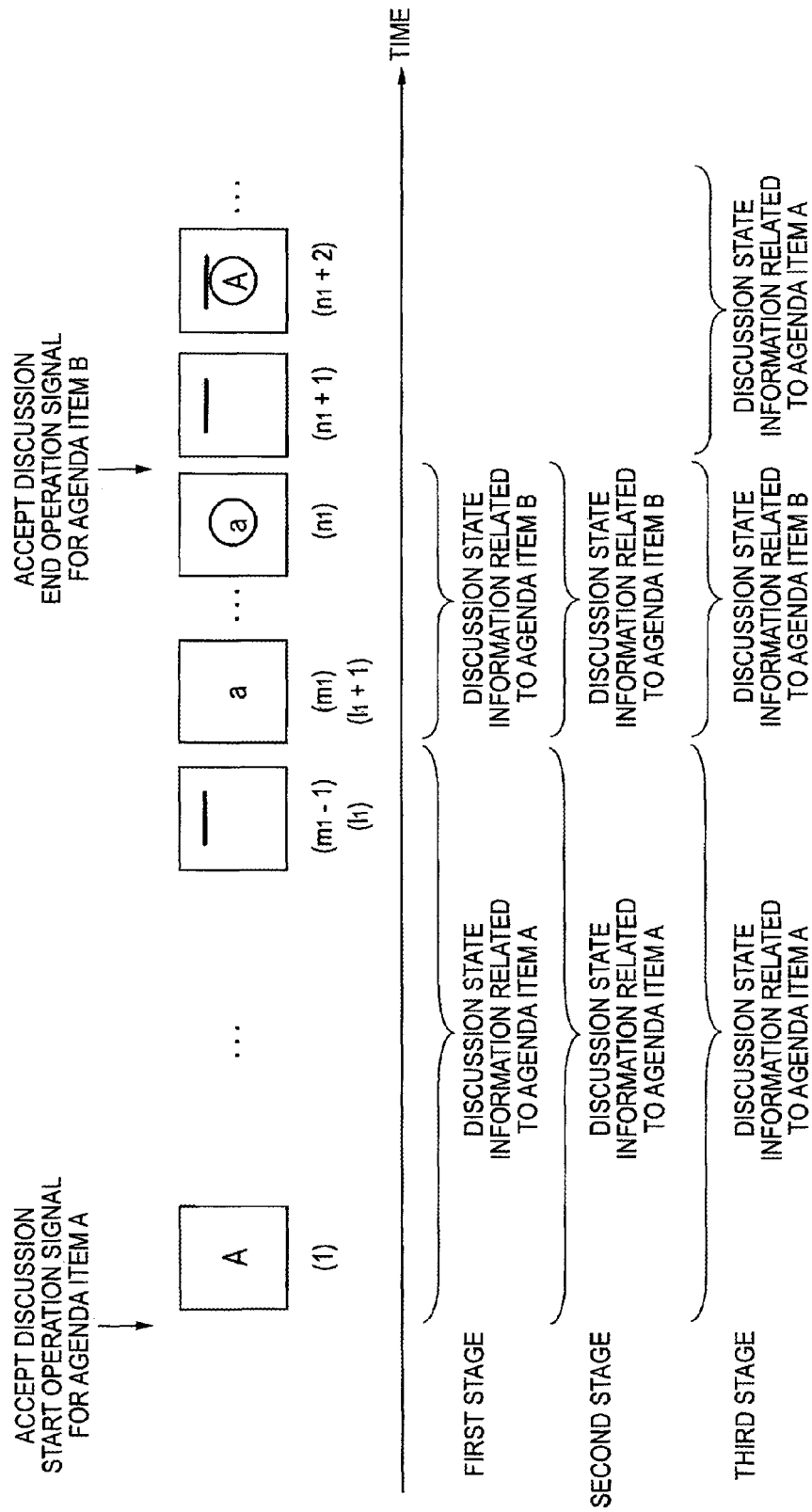

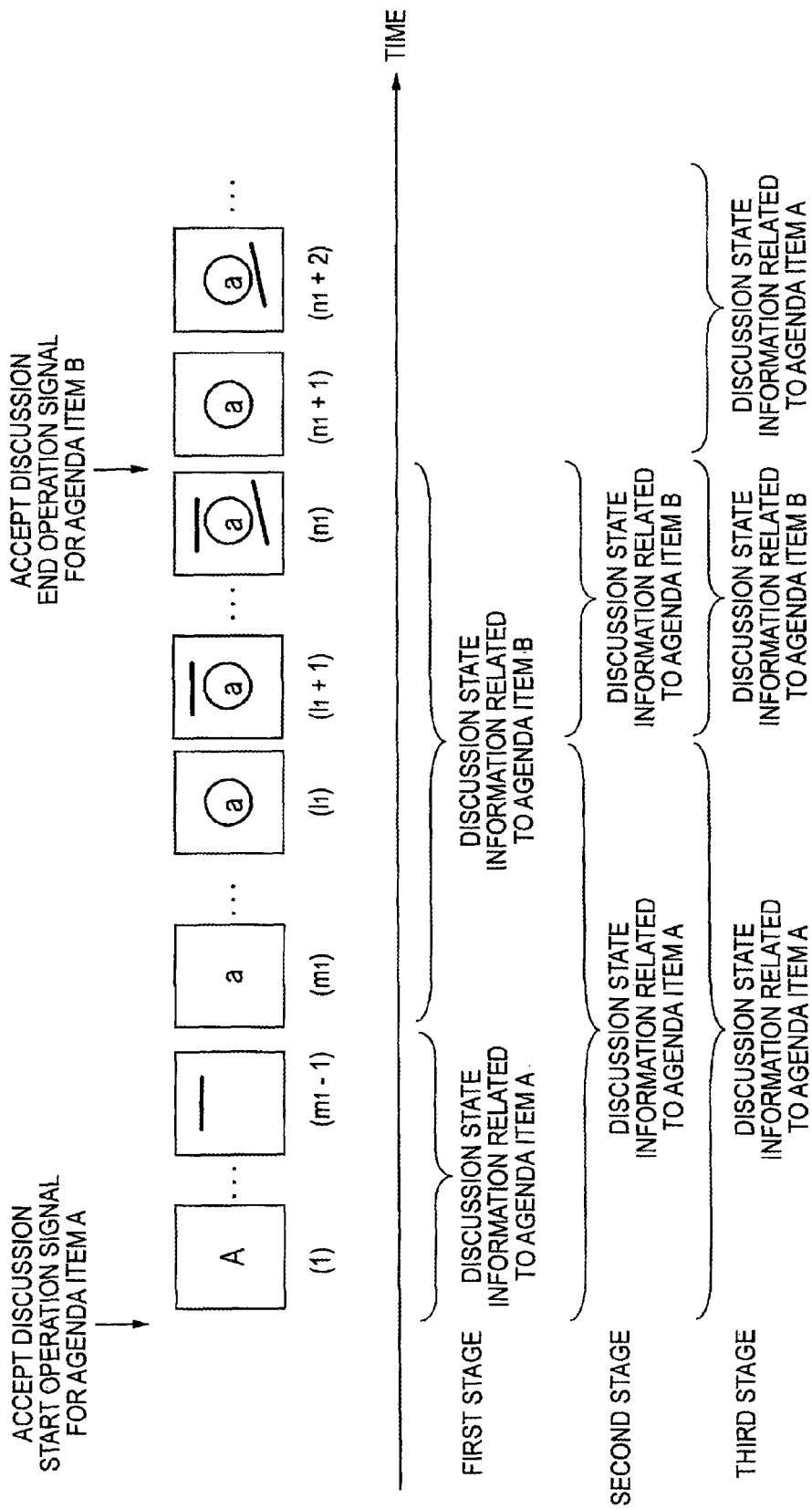

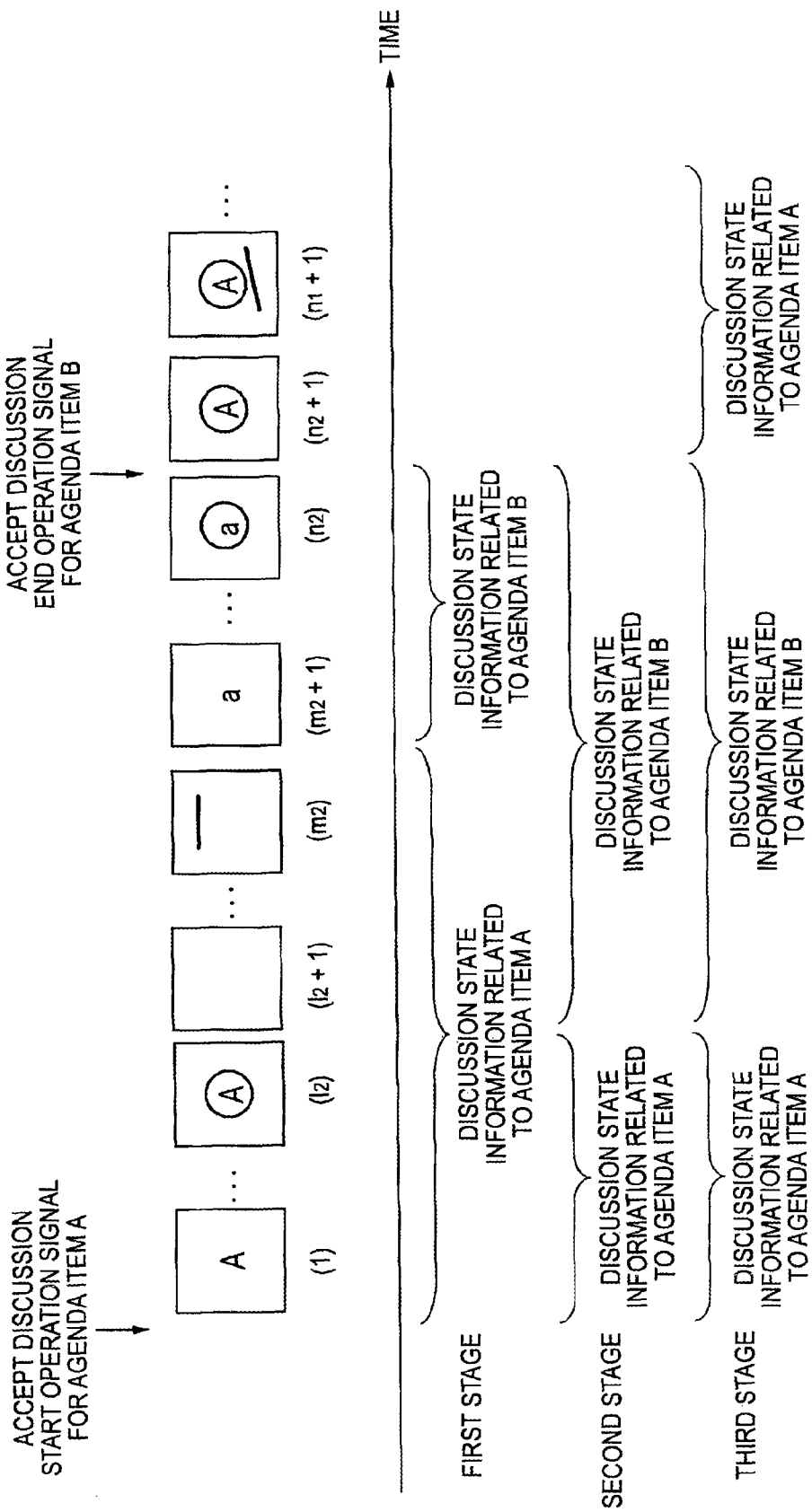

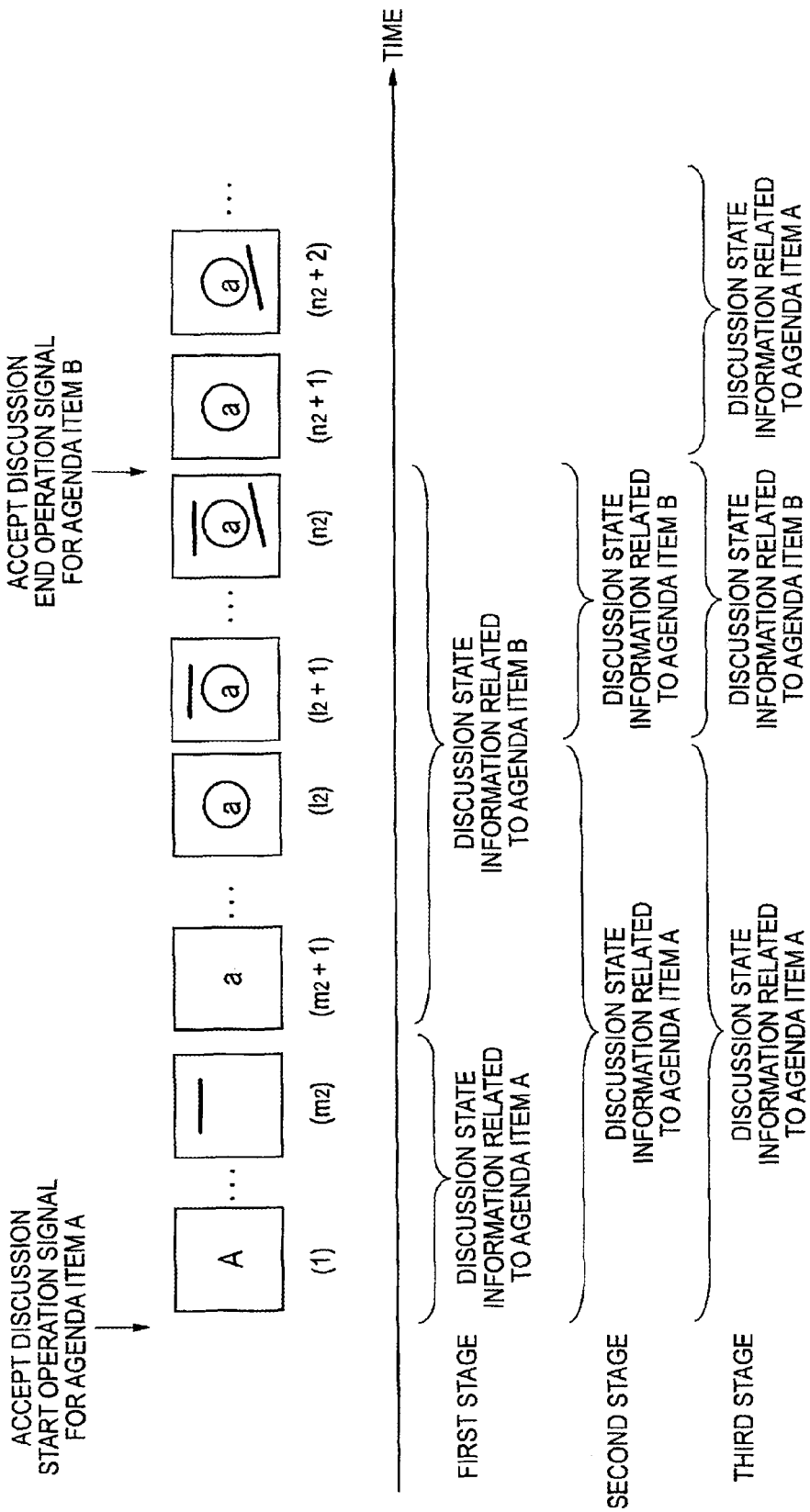

US 8,296,363 B2

DISCUSSION SUPPORT APPARATUS, DISCUSSION SUPPORT METHOD, AND COMPUTER-READABLE MEDIUM

CROSS-REFERENCE TO RELATED APPLICATIONS

This application is based on and claims priority under 35 USC 119 from Japanese Patent Application No. 2009-61641 filed Mar. 13, 2009.

BACKGROUND

1. Technical Field

The present invention relates to a discussion support apparatus, a discussion support method and a computer-readable medium storing a program that causes a computer to execute a discussion support process.

2. Related Art

There is a discussion support apparatus that supports discussions where people express their ideas and opinions about topics.

SUMMARY

According to an aspect of the invention, a discussion support apparatus includes a holding unit, an accepting unit and a generating unit. The holding unit holds plural pieces of discussion state information each indicating a state of a discussion at a corresponding one of points in time included in a period of time during which discussions are performed. The accepting unit accepts a discussion start operation indicating a start of discussion on a topic for which discussion has been started. The generating unit generates, based on one or more of the plural pieces of discussion state information indicating states of discussions at points in time before a point in time when the accepting unit accepts a discussion start operation for a certain topic, topic-related information indicating at least one piece of discussion state information which is related to the certain topic and which is specified from among the one or more of the plural pieces of discussion state information.

BRIEF DESCRIPTION OF THE DRAWINGS

Exemplary embodiments of the invention will be described in detail below based on the accompanying drawings, wherein:

FIG. 6 is a flowchart showing an example of flow of a process performed by the discussion support apparatus according to the exemplary embodiment of the present invention;

FIG. 7A is a diagram showing an example of a correspondence relationship between the discussion state information and agenda items;

FIG. 7B is a diagram showing an example of the correspondence relationship between the discussion state information and the agenda items;

FIG. 7C is a diagram showing an example of the correspondence relationship between the discussion state information and the agenda items;

FIG. 9A is a diagram showing an example of the correspondence relationship between the discussion state information and the agenda items;

FIG. 9C is a diagram showing an example of the correspondence relationship between the discussion state information and the agenda items.

DETAILED DESCRIPTION

Exemplary embodiments of the present invention will be described in detail below based on the drawings.

Figure 1:
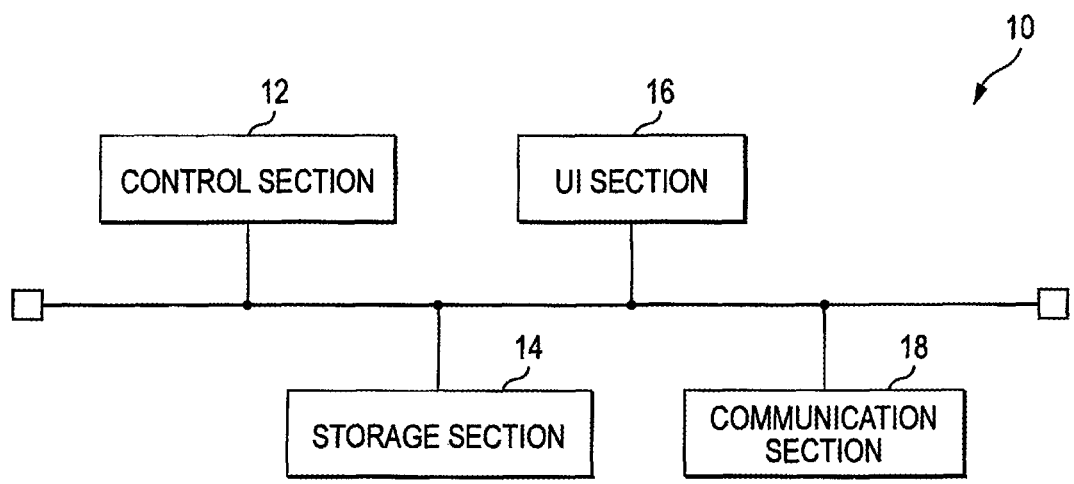
FIG. 1 is a diagram showing an example of a hardware configuration of a discussion support apparatus according to an exemplary embodiment of the present invention.

As exemplified in a hardware configuration diagram in FIG. 1, a discussion support apparatus 10 according to this exemplary embodiment includes, for example, a control section 12, a storage section 14, a user interface (UI) section 16, and a communication section 18. These components are connected to one another via a bus, etc.

The control section 12 is a program control device such as a CPU and operates according to a program installed on the discussion support apparatus 10. The storage section 14 includes storage elements such as a ROM and a RAM, a hard disk, etc. The storage section 14 stores a program to be executed by the control section 12, etc. The storage section 14 also operates as a working memory for the control section 12. The UI section 16 includes a display, a projector, a screen, a camera, a microphone, a speaker, a mouse, a button, etc., and outputs contents of an operation performed by a user or audio input by the user to the control section 12. The UI section 16 also display-outputs or audio-outputs information according to an instruction input from the control section 12. In this exemplary embodiment, the UI section 16 includes two output devices (e.g., a display and a screen onto which an image output through a projector is projected). The communication section 18 is, for example, a communication interface such as a network board and transmits and receives information to and from, for example, a file server (not shown) connected via a network such as a LAN.

Figure 2:
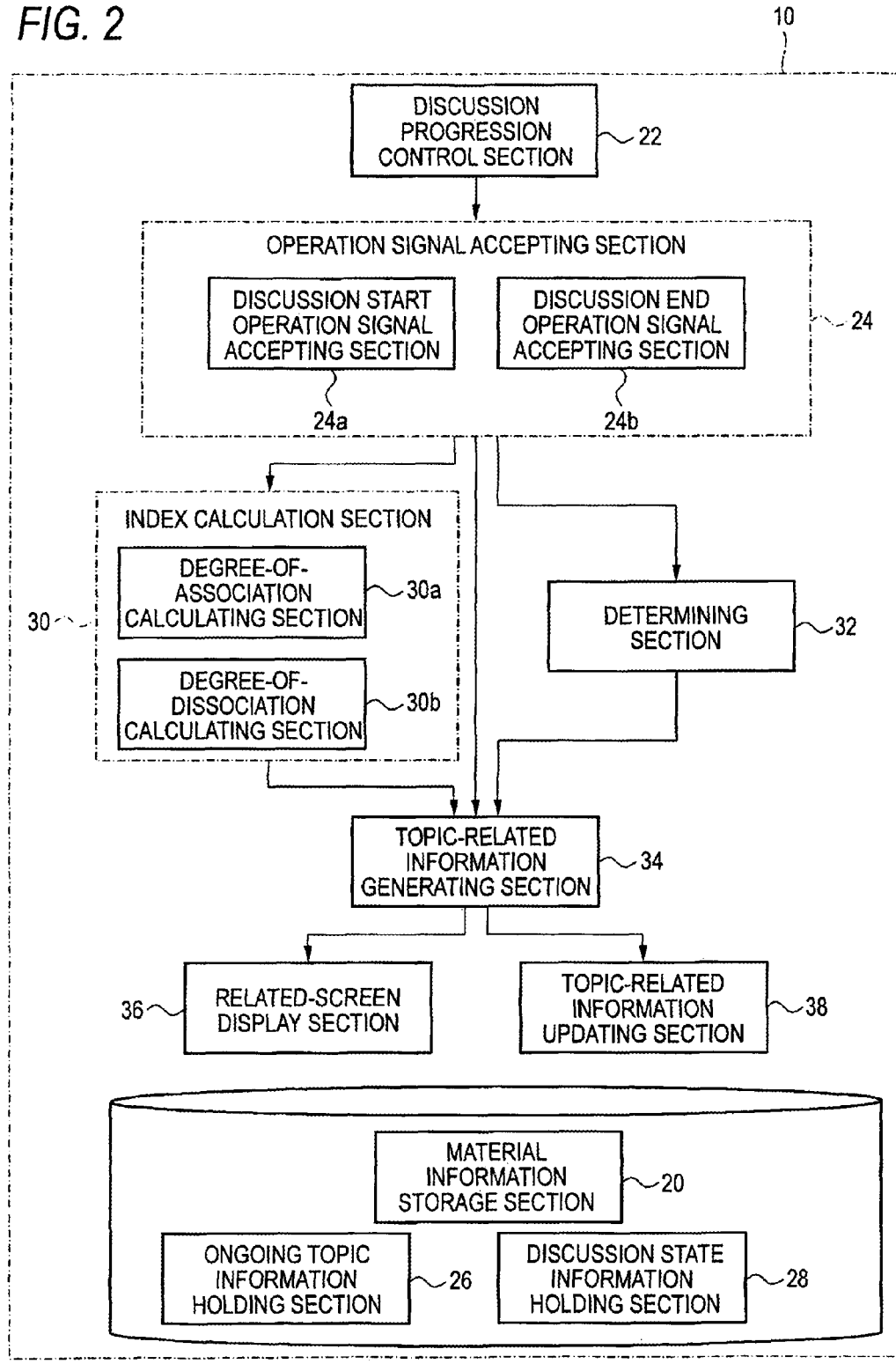
FIG. 2 is a functional block diagram showing an example of functions implemented by the discussion support apparatus according to the exemplary embodiment of the present invention.

FIG. 2 is a functional block diagram showing an example of functions implemented by the discussion support apparatus 10 according to this exemplary embodiment. As exemplified in FIG. 2, the discussion support apparatus 10 functions as including a material information storage section 20, a discussion progression control section 22, an operation signal accepting section 24, an ongoing topic information holding section 26, a discussion state information holding section 28, an index calculation section 30, a determining section 32, a topic-related information generating section 34, a related-screen display section 36, and a related-topic information updating section 38. The operation signal accepting section 24 includes a discussion start operation signal accepting section 24a and a discussion end operation signal accepting section 24b. The index calculation section 30 includes a degree-of-association calculation section 30a and a degree-of-dissociation calculation section 30b. The material information storage section 20, the ongoing topic information holding section 26, and the discussion state information holding section 28 are mainly implemented by the storage section 14. Other components are mainly implemented by the control section 12.

These components are implemented by having the control section 12 of the discussion support apparatus 10 to execute a program installed in the discussion support apparatus 10 which is a computer. The program is supplied to the discussion support apparatus 10 through, for example, a computer-readable information transmission medium such as a CD-ROM or DVD-ROM or through a communication network such as the Internet.

The material information storage section 20 stores material information such as electronic documents to be used in discussions (e.g., discussions at meetings, etc.). It is noted that the material information storage section 20 may be implemented by, for example, a hard disk included in a file server connected through the communication section 18. In this exemplary embodiment, several pieces of material information are attached with electrical marks, such as electronic sticky notes, provided with the identifiers or names of agenda items, for example, and associated with discussion topics, for example (in this exemplary embodiment, agenda items, for example).

The discussion progression control section 22 accepts a request or operation from/by a user and performs control to support the progression of a discussion.

Figure 3:
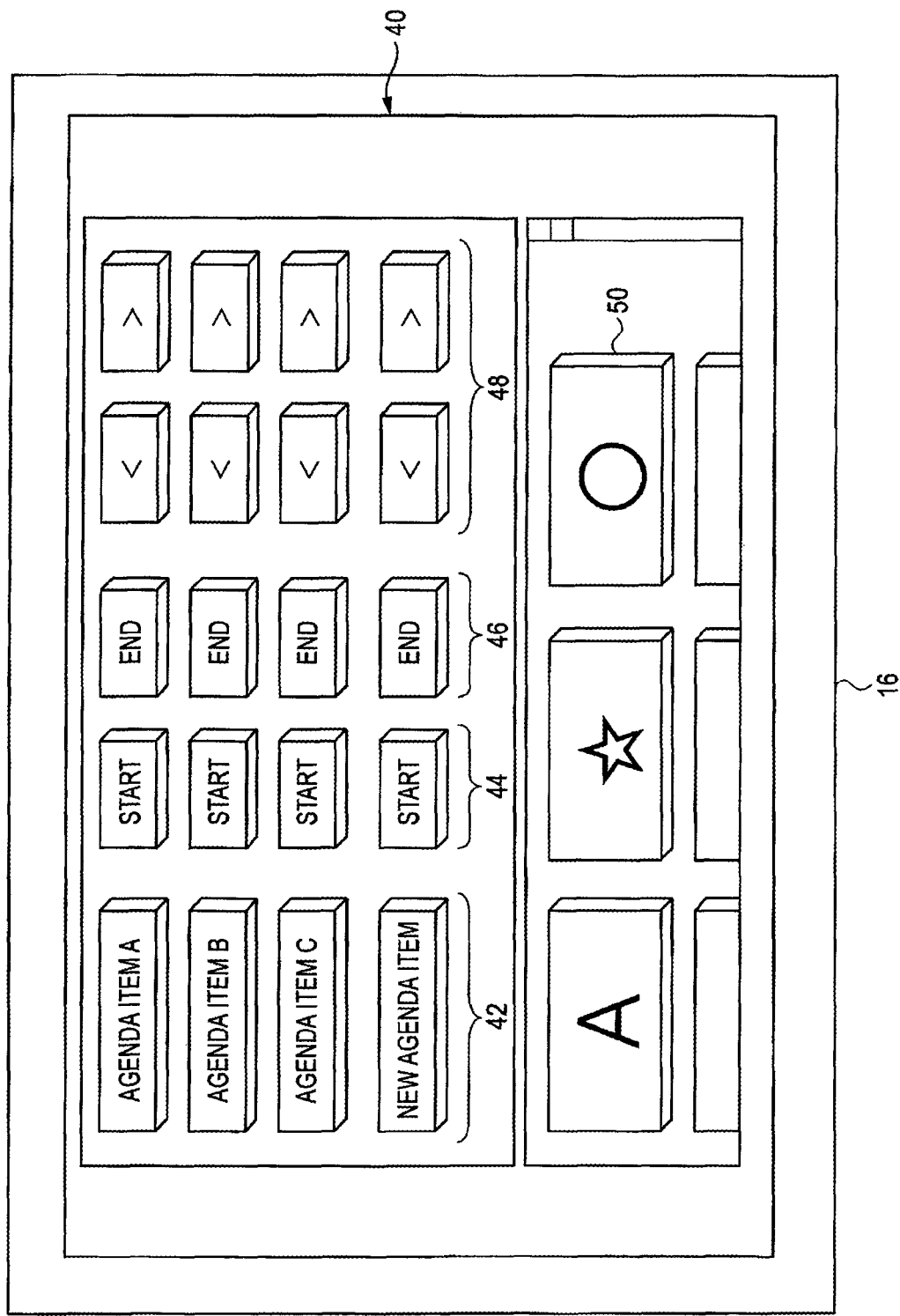
FIG. 3 is a diagram showing an example of an operation screen.

Specifically, for example, the discussion progression control section 22 display-outputs an operation screen 40 exemplified in FIG. 3 to the UI section 16 such as a display.

FIG. 3 is a diagram showing an example of the operation screen 40. As exemplified in FIG. 3, the operation screen 40 includes agenda item buttons 42, discussion start buttons 44, discussion end buttons 46, restart information change buttons 48, and material information selection buttons 50.

The agenda item buttons 42 have thereon the identifiers or names of agenda items at a meeting, for example. The discussion progression control section 22 generates agenda item buttons 42 based on, for example, electronic sticky notes attached to material information stored in the material information storage section 20, and displays the agenda item buttons 42 on the UI section 16. As such, the agenda item buttons 42 are associated with the agenda items. Then, the discussion progression control section 22 generates the discussion start buttons 44, the discussion end buttons 46, and the restart information change buttons 48, each of which is associated with a corresponding one of the agenda items, and displays the generated buttons on the UI section 16 such as the display.

The material information selection buttons 50 are associated with pieces of material information (e.g., electronic documents) stored in the material information storage section 20. The material information selection buttons 50 have thereon information representing the corresponding material information (e.g., an image representing an identifier, a name, a summary, or a representative page).

When the user presses, for example, an agenda item button 42 by the UI section 16 such as a mouse, the discussion progression control section 22 accepts a signal indicating that the agenda item button 42 has been pressed. Then, the discussion progression control section 22 outputs, to the UI section 16 such as a screen through a projector, for example, a portion of material information attached with an electronic sticky note associated with the agenda item button 42, the portion corresponding to a position where the electronic sticky note is attached.

When the user presses, for example, a material information selection button 50 by the UI section 16 such as the mouse, the discussion progression control section 22, for example, accepts a signal indicating that the material information selection button 50 has been pressed. Then, the discussion progression control section 22 outputs a predetermined portion (e.g., a first page) of material information associated with the pressed material information selection button 50, to the UI section 16 such as a screen through a projector, for example. In this exemplary embodiment, when the user presses, for example, a material information selection button 50 associated with a material related to a scheduled agenda item, the discussion progression control section 22 outputs the associated material.

Figure 4:
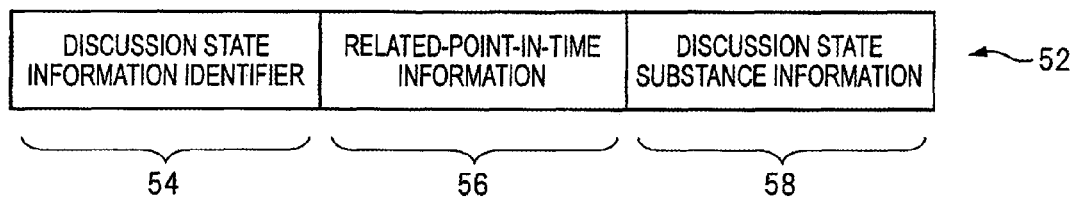
FIG. 4 is a diagram showing an example of a data structure of discussion state information.

The operation signal accepting section 24 accepts a signal indicating start or end of a discussion on an agenda item (for example, any of agenda items A, B and C which are shown in FIG. 4 and are set up before a meeting starts), according to an operation performed by the user. The discussion start operation signal accepting section 24a accepts a discussion start operation signal indicating start of a discussion on an agenda item. The discussion end operation signal accepting section 24b accepts a discussion end operation signal indicating end of a discussion on an agenda item for which discussion has completed.

When the user presses, for example, a discussion start button 44 on the operation screen 40 by the UI section 16 such as the mouse, the discussion start operation signal accepting section 24a accepts a discussion start operation signal which indicates start of a discussion on an agenda item (e.g., an agenda item A) and which is associated with an identifier of the agenda item (e.g., the agenda item A) corresponding to the pressed discussion start button 44. In this exemplary embodiment, in this case, the discussion progression control section 22 generates ongoing topic information (e.g., including an identifier of an agenda item) indicating a topic such as an agenda item for which discussion is to start (e.g., the agenda item A in this case) and outputs the ongoing topic information to the ongoing topic information holding section 26. The ongoing topic information holding section 26 holds at least one piece of ongoing topic information in a data structure such as a stack structure.

When the user writes, using an electronic pen, etc., letters, graphics, etc., on material information output from the UI section 16 (e.g., material information projected onto the screen), the discussion progression control section 22 detects the written letters, graphics, etc., and outputs the detected letters, graphics, etc., to the UI section 16 such as a screen so that the detected letters, graphics, etc. are superimposed on the projected material information. Specifically, for example, the discussion progression control section 22 may detect written letters, graphics, etc., by detecting the pressure of the electronic pen. Alternatively, the discussion progression control section 22 may detect written letters, graphics, etc., based on the movement of the electronic pen. The movement of the electronic pen may be detected based on images that are captured at predetermined time intervals by a camera provided at a corner of the screen, a camera mounted on the electronic pen, or the like.

The discussion progression control section 22 generates discussion state information 52 indicating a state of a discussion at a point in time included in a period of time during which discussions are performed (see FIG. 4). FIG. 4 is a diagram showing an example of a data structure of the discussion state information 52. As exemplified in FIG. 4, the discussion state information 52 includes, for example, a discussion state information identifier 54 which is an identifier of the discussion state information 52, related-point-in-time information 56, and discussion state substance information 58. The related-point-in-time information 56 corresponds to a point in time related to the discussion state information 52. In this exemplary embodiment, the related-point-in-time information 56 indicates, for example, a time at which the discussion state information 52 is generated. As such, in this exemplary embodiment, the discussion state information 52 corresponds to a time, for example. It is noted that the related-point-in-time information 56 may indicate a number indicating the order in which the discussion state information 52 is generated. The discussion state substance information 58 indicates the substance of the discussion state information 52. The discussion state substance information 58 is, for example, a string of letters indicating the contents of statement made at a certain point in time; the contents of a posted article written at a certain point in time during a discussion on an electronic bulletin board, etc.; letters and graphics having been written in material information using an electronic pen, etc., up to a certain point in time; or an image in which letters and graphics having been written using an electronic pen, etc., up to a certain point in time are superimposed on material information. In this exemplary embodiment, the discussion state substance information 58 is, specifically, for example, an image generated by having the discussion progression control section 22 to capture information (an image) output to the UI section 16 such as the screen through the projector.

The discussion progression control section 22, for example, accepts a signal indicating that a material information selection button 50 has been pressed and generates, upon changing information which is to be output to the UI section 16, discussion state information 52 based on information output to the UI section 16 immediately before the change. In the case where the operation screen 40 or an image output to the screen includes a screen save button (not shown), when the user presses the screen save button by the UI section 16 such as the mouse, the discussion progression control section 22 may detect that the screen save button has been pressed and generate discussion state information 52 based on information output to the UI section 16 at that point in time. Alternatively, the discussion progression control section 22 may generate discussion state information 52 at predetermined time intervals or at timing based on a predetermined condition.

The discussion progression control section 22 then outputs the generated discussion state information 52 to the discussion state information holding section 28. The discussion state information holding section 28 holds the received discussion state information 52. In this exemplary embodiment, as the discussion progresses, pieces of discussion state information 52 which relate to at least one agenda item (e.g., an agenda item A) are accumulated in the discussion state information holding section 28.

Hereinafter, in this exemplary embodiment, discussion state information 52 that is n-th generated after the discussion start operation signal accepting section 24a accepts a discussion start operation signal for the first agenda item is represented as discussion state information 52(n).

There may be a case in which, for example, while participants of a discussion such as users discuss a topic indicated by ongoing topic information that is last added to the ongoing topic information holding section 26 (i.e., an agenda item (e.g., agenda item A) considered to be currently under discussion), the discussion jumps to another topic and a conclusion for said another topic is obtained. In such a case, the user may press a discussion end button 46 associated with said another topic (e.g., an agenda item B) by the UI section 16 such as the mouse. As such, before the user presses a discussion end button 46 associated with the agenda item (e.g., the agenda item A) associated with the discussion start button 44 which was pressed upon the start of the discussion, the user may press the discussion end button 46 associated with another topic (e.g., the agenda item B) different than the previous topic (e.g. the agenda item A). When a corresponding agenda item is not displayed on the operation screen 40, the user may press a discussion end button 46 associated with a "new agenda item".

Also, there may be a case in which, for example, while participants of the discussion such as users discuss a topic indicated by ongoing topic information that is last added to the ongoing topic information holding section 26 (i.e., a topic (e.g., an agenda item A) considered to be currently under discussion), the discussion jumps to another topic and the participants realize that they are discussing another topic. In such a case, the user may press a discussion start button 44 associated with said another topic (e.g., an agenda item B) using the UI section 16 such as the mouse, at a point in time when the user realizes that the participants are discussing said another topic. As such, before the user presses the discussion end button 46 associated with a topic (e.g., the agenda item A) associated with the discussion start button 44 which was pressed upon the start of a discussion, the user may press a discussion start button 44 associated with another topic (e.g., the agenda item B) different than the previous topic (e.g., the agenda item A).

The index calculation section 30 calculates, based on each discussion state information 52 held in the discussion state information holding section 28, an index for each discussion state information 52 that indicates a degree of association or dissociation between each discussion state information 52 and an agenda item. The degree-of-association calculation section 30a calculates the degree of association between each discussion state information 52 and an agenda item. The degree-of-dissociation calculation section 30b calculates the degree of dissociation between each discussion state information 52 and an agenda item. It is noted that the index calculation section 30 may calculate both the degree of association and the degree of dissociation.

The degree-of-association calculation section 30a, specifically, for example, calculates the degree of association between each discussion state information 52 and an agenda item B (or agenda item A) based on whether or not an electronic sticky note associated with the agenda item B (or agenda item A) is attached to the discussion state substance information 58 of each discussion state information 52. It is noted that the degree-of-association calculation section 30a may calculate the degree of association between each discussion state information 52($i$) ($i$ denotes an integer) and an agenda item based on, for example, (a) whether or not the discussion state substance information 58 of each discussion state information 52($i$) indicates an electronic document in common with that indicated by discussion state substance information 58 of discussion state information 52($i$+1) (immediately following discussion state information) which relates to a next point in time to the point in time of each discussion state information 52($i$), (b) whether or not a difference between the point in time related to each discussion state information 52($i$) and a point in time related to immediately following discussion state information 52($i$+1) is equal to or less than a predetermined time (e.g., 10 seconds), or (c) whether or not writing is performed onto the discussion state substance information 58 of each discussion state information 52($i$) by a user different from one who writes into immediately following discussion state information 52($i$+1). It is noted that the degree-of-association calculation section 30$a$ may calculate the degree of association between each discussion state information 52 and the agenda item A.

The degree-of-dissociation calculation section 30$b$, specifically, for example, calculates the degree of dissociation between each discussion state information 52($i$) and an agenda item A based on, for example, (a) whether or not the discussion state substance information 58 of each discussion state information 52($i$) indicates a different electronic document than that indicated by discussion state information 52($i$−1) (immediately preceding discussion state information) which relates to a point in time immediately preceding the point in time of each discussion state information 52($i$), (b) whether or not an electronic stick note associated with another agenda item (e.g., an agenda item B) is attached to the discussion state substance information 58 of each discussion state information 52($i$), (c) the number of pieces of discussion state information 52 which are accumulated in the discussion state information holding section 28 after the point in time when the discussion start button 44 associated with the agenda item A was pressed, or (d) whether or not writing is performed onto the discussion state substance information 58 of each discussion state information 52($i$) by a user different from one who writing into immediately preceding discussion state information 52($i$−1). It is noted that the degree-of-dissociation calculation section 30$b$ may calculate the degree of dissociation between each discussion state information 52($i$) and an agenda item B.

The determining section 32 determines, based on each discussion state information 52($i$) held in the discussion state information holding section 28, as to whether or not each discussion state information 52($i$) indicates a state of a discussion on an agenda item (for example, any of agenda items A, B and C which are shown in FIG. 4 and are set up before a meeting starts). The determining section 32 may determine, based on a comparison result between the discussion state information 52 related to a point in time when a discussion start operation signal or a discussion end operation signal is accepted, and each discussion state information 52($i$) held in the discussion state information holding section 28, as to whether or not each discussion state information 52($i$) indicates a state of a discussion on an agenda item. Alternatively, the determining section 32 may make the determination based on the indices (e.g., the degrees of association or the degrees of dissociation) calculated by the index calculation section 30. The determining section 32 may, specifically, for example, make the determination based on a comparison result between the degrees of association or the degrees of dissociation for each discussion state information 52($i$) and a predetermined value.

Figure 5:
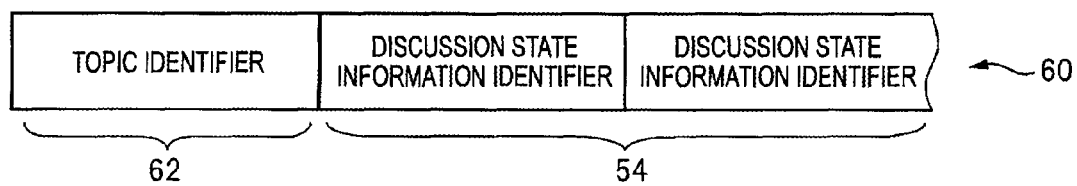
FIG. 5 is a diagram showing an example of a data structure of topic-related information.

The topic-related information generating section 34 generates, based on at least one piece of discussion state information 52 held in the discussion state information holding section 28, topic-related information 60 indicating discussion state information 52 which is related to an agenda item (for example, any of agenda items A, B and C which are shown in FIG. 4 and are set up before a meeting starts) and which are specified from among the at least one piece of discussion state information 52 in the discussion state information holding section 28 (see FIG. 5). FIG. 5 is a diagram showing an example of a data structure of the topic-related information 60. As exemplified in FIG. 5, the topic-related information 60 includes, for example, a topic identifier 62 (e.g., a character string "agenda item B") which is an identifier of an agenda item and at least one piece of discussion state information identifier 54, which is specified by the topic-related information generating section 34. As such, the topic-related information 60 is associated with a topic (e.g., an agenda item). Also, the topic-related information 60 is associated with at least one piece of discussion state information 52. The topic-related information generating section 34 may generate the topic-related information 60 based on the determination result(s) obtained by the determining section 32. Also, the topic-related information generating section 34 may generate the topic-related information 60 indicating pieces of discussion state information 52 that are adjacent to each other in terms of order, which is based on the respective pieces of related-point-in-time information 56 (e.g., points of time related to the pieces of discussion state information 52 are adjacent to each other).

The related-screen display section 36 display-outputs to the UI section 16, such as a screen, an image (screen) related to any one of pieces of discussion state information 52 which are held in the discussion state information holding section 28 and which are different than a piece(s) of discussion state information 52 indicated by the topic-related information 60 generated by the topic-related information generating section 34, after a discussion start operation signal or a discussion end operation signal is accepted.

The topic-related information updating section 38 updates the topic-related information 60 in response to a request from the user.

Now, an example of a process performed by the discussion support apparatus 10 in the case where, after the user presses a discussion start button 44 associated with an agenda item A, $n_1$ pieces of discussion state information 52 are accumulated in the discussion state information holding section 28 and then the user presses a discussion end button 46 associated with an agenda item B will be described with reference to a flowchart exemplified in FIG. 6.

First, the discussion end operation signal accepting section 24$b$ accepts a discussion end operation signal for the agenda item B (S101). Then, the degree-of-association calculation section 30$a$ calculates the degrees of association between each discussion state information 52 (discussion state information 52($l$) to discussion state information 52($n_1$)) held in the discussion state information holding section 28 and the agenda item B (S102). Then, the determining section 32 sequentially determines, based on the degrees of association calculated in the operation exemplified at S102, as to whether each of the pieces of discussion state information 52, which relate to points in time before the point in time when the discussion end operation signal is accepted in the operation exemplified at S101 indicates a state of a discussion on the agenda item B, in order from the newest points in time (e.g., discussion state information 52($n_1$) to the oldest points in time (e.g., discussion state information 52($n_1$−1), discussion state information 52($n_1$−2) . . . ) (S103). Then, when the determination results obtained by the determining section 32 in the operation exemplified at step S103 change (e.g., when, after determining that pieces of discussion state information 52 up to discussion state information 52($m_1$) indicate states of the discussion on the agenda item B, it is determined that discussion state information 52($m_1$−1) does not indicate a state of the discussion on the agenda item B), the topic-related information generating section 34 generates topic-related information 60 including (a) discussion state information identifiers 54 associated with pieces of discussion state information 52 (e.g., the discussion state information 52($m_1$) to the discussion state information 52($n_1$), which are determined in an operation exemplified at S103 to indicate states of the discussion on the agenda item B, and (b) a topic identifier 62 associated with the agenda item B (S104). Then, the related-screen display section 36 display-outputs to the UI section 16, such as the screen, an image (a screen) related to any one of pieces of discussion state information 52 which relate to the agenda item A (e.g., discussion state information 52 having the latest point in time (e.g., the discussion state information 52($m_1$−1)) among pieces of discussion state information 52 related to the agenda item A) among the pieces of discussion state information 52 held in the discussion state information holding section 28 (S105). FIGS. 7A, 7B, and 7C show examples of a correspondence relationship between discussion state information 52 and an agenda item. The correspondence relationship between the discussion state information 52 and the agenda items at this point in time corresponds to the "first stage" shown in each of FIGS. 7A, 7B, and 7C.

It is noted that, in the operation exemplified at S104 in the aforementioned exemplary process, the topic-related information generating section 34 may generate topic-related information 60 including discussion state information identifiers 54 associated with pieces of discussion state information 52 (e.g., discussion state information 52($l$) to discussion state information 52($m_1$−1)) other than the pieces of discussion state information 52 determined to indicate states of the discussion on the agenda item B, and a topic identifier 62 associated with the agenda item A. Alternatively, both of (a) the topic-related information 60 including the topic identifier 62 associated with the agenda item A and (b) the topic-related information 60 including the topic identifier 62 associated with the agenda item B may be generated.

After the operation exemplified at S105, a restart information change button 48 associated with the agenda item A may be pressed. In this case, the discussion progression control section 22 accepts a signal indicating that the restart information change button 48 has been pressed and changes information which is to be output to the UI section 16 according to the pressed restart information change button 48. For example, it is assumed that information corresponding to discussion state information 52($i$) is currently being output to the UI section 16, such as the screen (i is an integer). In this case, if the discussion progression control section 22 accepts the signal indicating that the restart information change button 48 has been pressed once, the discussion progression control section 22 outputs to the UI section 16 (a) information corresponding to discussion state information 52($i$+1) which relates to a point in time following the discussion state information 52($i$) or (b) information corresponding to discussion state information 52($i$−1) which relates to a point in time preceding the discussion state information 52($i$).

Thereafter, when the user presses a discussion start button 44 associated with the agenda item A, the topic-related information updating section 38 updates the topic-related information 60 based on information which is currently output to the UI section 16 at that point in time. Specifically, it is assumed that, after the process at S105, the restart information change button 48 (e.g., the "<" button shown in FIG. 3) associated with the agenda item A is pressed ($n_1$−$l_1$) times, that information corresponding to discussion state information 52($l_1$) is currently being output to the UI section 16 (the discussion state information 52($l_1$) is selected), and that the discussion start button 44 associated with the agenda item A is pressed. It is noted that discussion state substance information 58 of discussion state information 52($n_1$+1) is identical with discussion state substance information 58 of the discussion state information 52($l_1$). In this case, the topic-related information updating section 38 updates the topic-related information 60 associated with the agenda item B so as to include discussion state information identifiers 54 of discussion state information 52 (e.g., discussion state information 52($l_1$+1) to discussion state information 52($n_1$)) relating to points in time which are later than the point in time of the discussion state information 52($l_1$) corresponding to the information being output to the UI section 16 (i.e., the discussion state information 52($l_1$) which is being selected (being currently output to the UI section 16) when the discussion start button 44 is pressed).

FIG. 7A shows an example of the correspondence relationship between the discussion state information 52 and the agenda items in the case where the discussion state information 52($l_1$) being selected (discussion state information 52($l_1$) being output to the UI section 16) when the discussion start button 44 is pressed is earlier than discussion state information 52($m_1$−1) (i.e., $l_1$<$m_1$−1). It is noted that the discussion state information 52($m_1$−1) is determined in the first stage of FIG. 7 to be related to the latest point in time among the pieces of discussion state information 52 (e.g., the discussion state information 52($l$) to 52($m_1$−1)) related to the agenda item A. In this exemplary embodiment, in this case, the topic-related information updating section 38, for example, updates the topic-related information 60 such that the discussion state information 52($l_1$+1) to the discussion state information 52($m_1$−1) are associated with the agenda item B (which corresponds to the "second stage" in FIG. 7A).

FIG. 7B shows an example of the correspondence relationship between the discussion state information 52 and the agenda items in the case where the discussion state information 52($l_1$) being selected (discussion state information 52($l_1$) being output to the UI section 16) when the discussion start button 44 is pressed is the discussion state information 52($m_1$−1) (i.e., $l_1$=$m_1$−1). In this exemplary embodiment, in this case, the topic-related information updating section 38, for example, does not update the topic-related information 60 (which corresponds to the "second stage" in FIG. 7B).

FIG. 7C shows an example of the correspondence relationship between the discussion state information 52 and the agenda items in the case where the discussion state information 52($l_1$) being selected (discussion state information 52($l_1$) being output to the UI section 16) when the discussion start button 44 is pressed is later than the discussion state information 52($m_1$−1) (i.e., $l_1$>$m_1$−1). In this exemplary embodiment, in this case, the topic-related information updating section 38, for example, updates the topic-related information 60 such that the discussion state information 52($m_1$) to the discussion state information 52($l_1$) are associated with the agenda item A (which corresponds to the "second stage" in FIG. 7C).

It is noted that, at this time, the topic-related information updating section 38 may, for example, update the topic-related information 60 related to the agenda item A so as to include discussion state information identifiers 54 of pieces of discussion state information 52 (e.g., the discussion state information 52($l$) to the discussion state information 52($l_1$)) which relate to points in time being same as or earlier than a point in time of the discussion state information 52 (e.g., the discussion state information 52($l_1$)) corresponding to the information being output to the UI section 16.

Thereafter, along with the progression of the discussion, the discussion progression control section 22 generates and outputs discussion state information 52 to the discussion state information holding section 28. Then, when the user presses a discussion end button 46 associated with the agenda item A, the topic-related information generating section 34 may generate, based on pieces of discussion state information 52 held in the discussion state information holding section 28, topic-related information 60 which is associated with the agenda item A and which relate to pieces of discussion state information 52 generated by the discussion progression control section 22 after the point in time of the generation of the discussion state information $52(n_1+1)$, for example (which corresponds to the "third stage" shown in each of FIGS. 7A, 7B, and 7C). Alternatively, the topic-related information updating section 38 may update the topic-related information 60 associated with the agenda item A. It is noted that, in this case, the discussion progression control section 22 may delete ongoing topic information which relate to the agenda item A and which is held in the ongoing topic information holding section 26.

Figure 8:
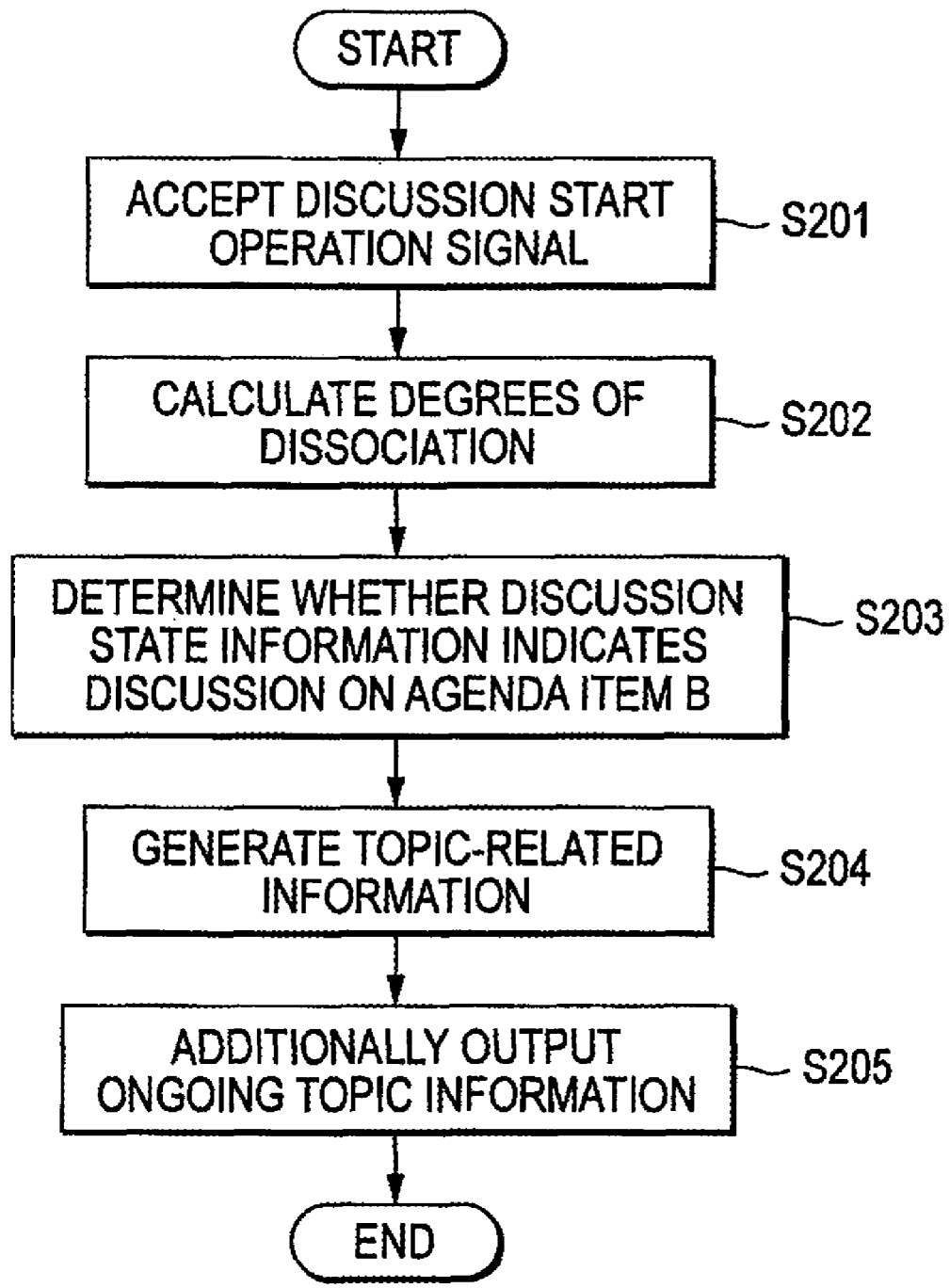
FIG. 8 is a flowchart showing an example of flow of a process performed by the discussion support apparatus according to the exemplary embodiment of the present invention.

Next, an example of a process performed by the discussion support apparatus 10 when, after the user presses the discussion start button 44 associated with the agenda item A, $n_2$ pieces of discussion state information 52 are accumulated in the discussion state information holding section 28 and thereafter the user presses the discussion start button 44 associated with the agenda item B will be described with reference to a flowchart exemplified in FIG. 8.

First, the discussion start operation signal accepting section 24a accepts a discussion start operation signal for the agenda item B (S201). Then, the degree-of-dissociation calculation section 30b calculates the degrees of dissociation between the respective pieces of discussion state information 52 (discussion state information 52(l) to discussion state information $52(n_2)$) held in the discussion state information holding section 28 and the agenda item B (S202). Then, the determining section 32 sequentially determines, based on the degrees of dissociation calculated in the operation exemplified at S202, as to whether the pieces of discussion state information 52 (e.g., discussion state information 52(l) to discussion state information $52(n_2)$), which relate to points in time from the point in time when the discussion start operation signal for the agenda item A is accepted to the point in time when the discussion start operation signal is accepted in the operation exemplified at S201 indicate states of a discussion on the agenda item B, in order from the oldest point in time to the newest point in time (e.g., the discussion state information 52(l), the discussion state information 52(2) . . . ) (S203). Then, when the determination results obtained by the determining section 32 in the operation exemplified at step S203 change (e.g., when, after determining that pieces of discussion state information up to discussion state information $52(m_2)$ do not indicate a state of a discussion on the agenda item B, it is determined that discussion state information $52(m_2+1)$ indicates a state of a discussion on the agenda item B), the topic-related information generating section 34 generates topic-related information 60 including (a) discussion state information identifiers 54 of pieces of discussion state information 52 (e.g., discussion state information $52(m_2+1)$ to discussion state information $52(n_2)$) other than pieces of discussion state information 52 that are determined in the operation exemplified at S203 to indicate states of the discussion on the agenda item A and (b) a topic identifier 62 associated with the agenda item B (S204). Then, the discussion progression control section 22 generates ongoing topic information related to the agenda item B and additionally outputs the ongoing topic information to the ongoing topic information holding section 26 (S205).

It is noted that, in the operation exemplified at S204 in the aforementioned exemplary process, the topic-related information generating section 34 may generate topic-related information 60 including (a) discussion state information identifiers 54 of the pieces of discussion state information 52 (e.g., the discussion state information 52(l) to the discussion state information $52(m_2)$), which are determined to indicate states of the discussion on the agenda item A and (b) the topic identifier 62 associated with the agenda item A. Alternatively, both of (a) the topic-related information 60 including the topic identifier 62 associated with the agenda item A and (b) the topic-related information 60 including the topic identifier 62 associated with the agenda item B may be generated.

Figure 9B:
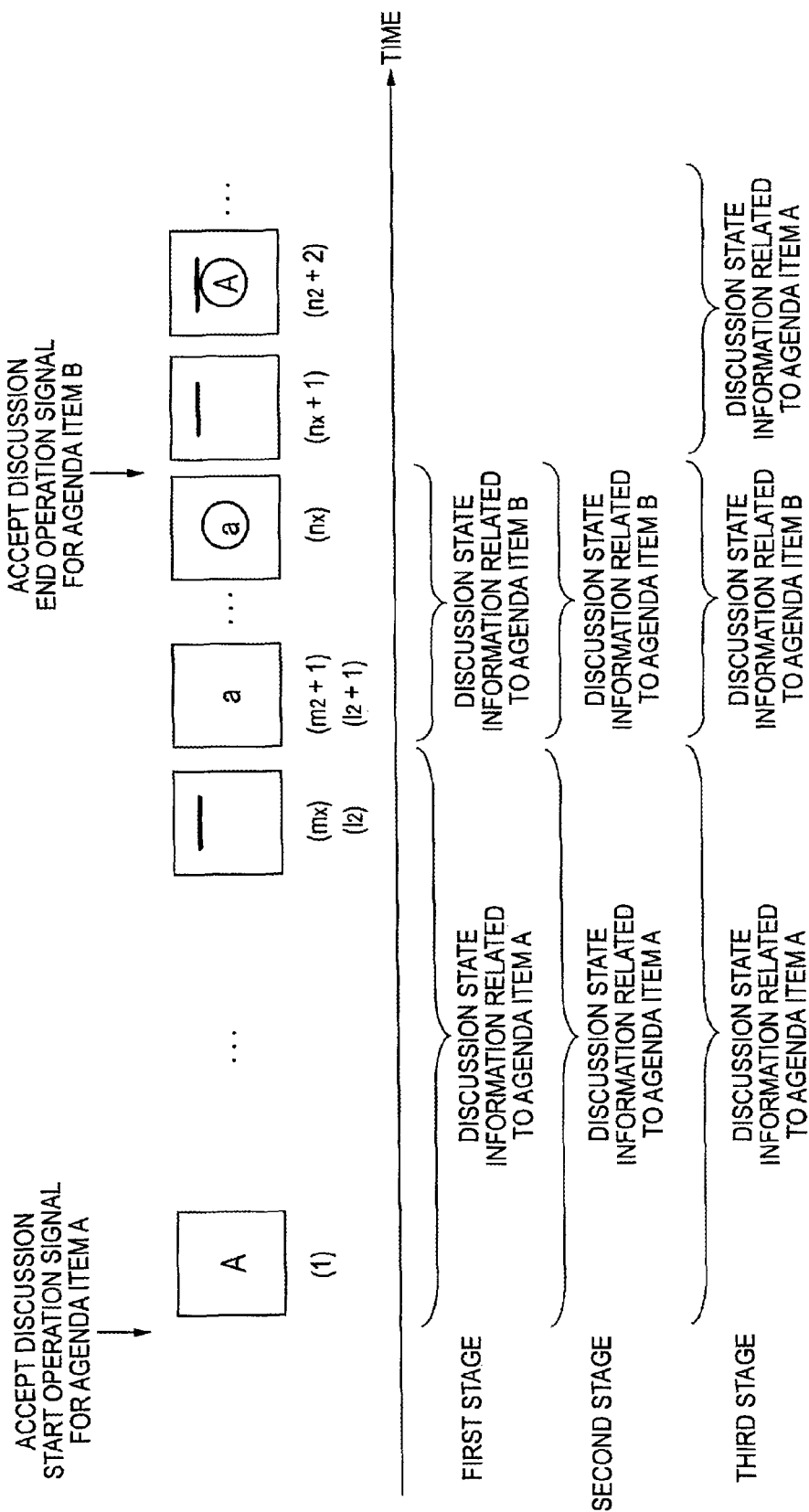
FIG. 9B is a diagram showing an example of the correspondence relationship between the discussion state information and the agenda items.

After the operation exemplified at S205 in the aforementioned exemplary process, the user may press an agenda item button 42 associated with the agenda item A. In this case, the related-screen display section 36 accepts a signal indicating that the agenda item button 42 associated with the agenda item A has been pressed and display-outputs to the UI section 16, such as a screen, an image (a screen) related to any one of pieces of discussion state information 52 which relate to the agenda item A (e.g., discussion state information 52 having the latest point in time (e.g., the discussion state information $52(m_2)$) among pieces of discussion state information 52 related to the agenda item A) and which are held in the discussion state information holding section 28. FIGS. 9A, 9B, and 9C show examples of the correspondence relationship between the discussion state information 52 and the agenda items. The correspondence relationship between the discussion state information 52 and the agenda items at this point in time corresponds to the "first stage" shown in each of FIGS. 9A, 9B, and 9C.

Here, it is assumed that the agenda item button 42 associated with the agenda item A is pressed at a point $n_2+1$ in time. The discussion progression control section 22 may delete ongoing topic information related to the agenda item B, which is the last one to be added to the ongoing topic information holding section 26. Then, the topic-related information generating section 34 may generate topic-related information 60 associated with the agenda item B based on pieces of discussion state information 52 accumulated in the discussion state information holding section 28 during a period of time from the point in time (e.g., $m_2+1$) when the discussion start operation signal for the agenda item B is accepted to the point in time (e.g., $n_2+1$) when the signal indicating that the agenda item button 42 associated with the agenda item A has been pressed is accepted.

Then, the user may press a restart information change button 48 associated with the agenda item A. In this case, as described above, the discussion progression control section 22 changes information which is to be output to the UI section 16.

Then, when the user presses a discussion start button 44 associated with the agenda item A, the topic-related information updating section 38 updates the topic-related information 60 based on information which is being output to the UI section 16 at that point in time. Specifically, it is assumed that, after the process at S205, the restart information change button 48 (e.g., the "<" button shown in FIG. 3) $(n_2-l_2)$ times, that information corresponding to discussion state information $52(l_2)$ is currently being output to the UI section 16 (the discussion state information $52(l_2)$ is selected), and that the discussion start button 44 associated with the agenda item A is pressed. It is noted that discussion state substance information 58 of discussion state information $52(n_2+1)$ is identical with discussion state substance information of the discussion state information $52(l_2)$. In this case, the topic-related information updating section 38 updates the topic-related information 60 associated with the agenda item B so as to include discussion state information identifiers 54 of pieces of discussion state information 52 (e.g., discussion state information $52(l_2+1)$ to discussion state information $52(n_2)$) which relate to points in time being later than the discussion state information $52(l_2)$ corresponding to information which is being output to the UI section 16 (e.g., discussion state information 52($l_2$) which is being selected (being output to the UI section 16) when the discussion start button 44 is pressed).

FIG. 9A shows an example of the correspondence relationship between the discussion state information 52 and the agenda items in the case where the discussion state information 52($l_2$) which is being selected (discussion state information 52($l_2$) which is being output to the UI section 16) when the discussion start button 44 is pressed is earlier than the discussion state information 52($m_2$) (i.e., $l_2$<$m_2$). It is noted that the discussion state information 52($m_2$) is determined in the first stage of FIG. 9 to be related to the latest point in time among the pieces of discussion state information 52 (e.g., the discussion state information 52($l$) to 52($m_2$)) related to the agenda item A. In this exemplary embodiment, in this case, the topic-related information updating section 38, for example, updates the topic-related information 60 such that the discussion state information 52($l_2$+1) to the discussion state information 52($m_2$) are associated with the agenda item B (which corresponds to the "second stage" in FIG. 9A).

FIG. 9B shows an example of the correspondence relationship between the discussion state information 52 and the agenda items in the case where the discussion state information 52(12) which is being selected (discussion state information 52($l_2$) which is being output to the UI section 16) when the discussion start button 44 is pressed is the discussion state information 52($m_2$) (i.e., $l_2$=$m_2$). In this exemplary embodiment, in this case, the topic-related information updating section 38, for example, does not update the topic-related information 60.

FIG. 9C shows an example of the correspondence relationship between the discussion state information 52 and the agenda items in the case where the discussion state information 52($l_2$) which is being selected (discussion state information 52($l_2$) which is being output to the UI section 16) when the discussion start button 44 is pressed is later than the discussion state information 52($m_2$) (i.e., $l_2$>$m_2$). In this exemplary embodiment, in this case, the topic-related information updating section 38, for example, updates the topic-related information 60 such that the discussion state information 52($m_2$+1) to the discussion state information 52($l_2$) are associated with the agenda item A.

It is noted that, at this time, for example, the topic-related information 60 associated with the agenda item A may be updated so as to include discussion state information identifiers 54 of pieces of discussion state information 52 (e.g., the discussion state information 52($l$) to the discussion state information 52($l_2$)) relating to point in time which are the same as or earlier than the discussion state information 52 (e.g., the discussion state information 52($l_2$)) corresponding to the information being output to the UI section 16.

Thereafter, when the user presses a discussion end button 46 associated with the agenda item A, as described above, the topic-related information generating section 34 may, for example, generate topic-related information 60 which is associated with the agenda item A and which relate to pieces of discussion state information 52 generated by the discussion progression control section 22 after the point in time of generation of the discussion state information 52($n_2$+1) (which corresponds to the "third stage" shown in each of FIGS. 9A, 9B, and 9C). Alternatively, the topic-related information updating section 38 may update the topic-related information 60 associated with the agenda item A. It is noted that, in this case, the discussion progression control section 22 may delete ongoing topic information related to the agenda item A, which is held in the ongoing topic information holding section 26.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

For example, the above-described exemplary embodiment may be applied to circumstances where there are three or more agenda items. For example, along with the progression of a discussion, the user may press buttons included in the operation screen 40 by the UI section 16 such as the mouse, in order of a discussion start button 44 associated with the agenda item A, a discussion start button 44 associated with the agenda item B, a discussion end button 46 associated with an agenda item C, a discussion end button 46 associated with the agenda item B, and a discussion end button 46 associated with the agenda item A.

Also, as in the above-described exemplary embodiment, when the discussion end operation signal accepting section 24b accepts a discussion end operation signal, the topic-related information generating section 34 may generate topic-related information 60. When discussion end operation signals for all agenda items are accepted (i.e., when there is no more ongoing topic information), the topic-related information generating section 34 may generate topic-related information 60 based on all pieces of discussion state information 52 held in the discussion state information holding section 28.

The discussion progression control section 22 may detect pressing of buttons included in the operation screen 40.

What is claimed is:

1. A discussion support method comprising:
   storing, via a processor, plural pieces of discussion state information including first discussion state information and second discussion state information, wherein the first discussion state information includes a first state indicating a first topic in a discussion and a first point in time of the first state in the discussion, and the second discussion state information includes a second state indicating a second topic in the discussion and a second point in time of the second state in the discussion, and when the first topic changes to the second topic in the discussion, the discussion state information changes from the first discussion state information to the second discussion state information;
   accepting, via the processor, at an operation point in time a discussion start operation indicating a state on another topic after the first state and the second state in the discussion;
   determining, via the processor, whether each of the plural pieces of discussion state information having a point in time occurring prior to the operation point in time is related to said another topic, based on a comparison result between said state on another topic and each of the plural pieces of discussion state information having the point in time occurring prior to the operation point in time; and
   generating, via the processor, based on a result of the determining, topic-related information indicating (i) one of the first discussion state information having the first point in time occurring prior to the operation point in time and the second discussion state information having the second point in time occurring prior to the operation point in time and (ii) one of the first topic and the second topic corresponding to the one of the first discussion state information having the first point in time occurring prior to the operation point in time and the second discussion state information having the second point in time occurring prior to the operation point in time.

2. A non-transitory computer-readable medium storing a program that causes a computer to execute a discussion support process, the discussion support process comprising:

storing plural pieces of discussion state information including first discussion state information and second discussion state information, wherein the first discussion state information includes a first state indicating a first topic in a discussion and a first point in time of the first state in the discussion, and the second discussion state information includes a second state indicating a second topic in the discussion and a second point in time of the second state in the discussion, and when the first topic changes to the second topic in the discussion, the discussion state information changes from the first discussion state information to the second discussion state information;

accepting at an operation point in time a discussion start operation indicating a state on another topic after the first state and the second state in the discussion;

determining whether each of the plural pieces of discussion state information having a point in time occurring prior to the operation point in time is related to said another topic, based on a comparison result between said state on another topic and each of the plural pieces of discussion state information having the point in time occurring prior to the operation point in time; and generating, based on a result of the determining, topic-related information indicating (i) one of the first discussion state information having the first point in time occurring prior to the operation point in time and the second discussion state information having the second point in time occurring prior to the operation point in time and (ii) one of the first topic and the second topic corresponding to the one of the first discussion state information having the first point in time occurring prior to the operation point in time and the second discussion state information having the second point in time occurring prior to the operation point in time.

3. A discussion support apparatus comprising:

a memory that stores plural pieces of discussion state information including first discussion state information and second discussion state information, wherein the first discussion state information includes a first state indicating a first topic in a discussion and a first point in time of the first state in the discussion, and the second discussion state information includes a second state indicating a second topic in the discussion and a second point in time of the second state in the discussion, and when the first topic changes to the second topic in the discussion, the discussion state information changes from the first discussion state information to the second discussion state information;

a user interface that accepts at an operation point in time a discussion start operation indicating a state on another topic after the first state and the second state in the discussion; and a processor that determines whether each of the plural pieces of discussion state information having a point in time occurring prior to the operation point in time is related to said another topic, based on a comparison result between said state on another topic and each of the plural pieces of discussion state information having the point in time occurring prior to the operation point in time, and that generates, based on a result of the determining, topic-related information indicating (i) one of the first discussion state information having the first point in time occurring prior to the operation point in time and the second discussion state information having the second point in time occurring prior to the operation point in time and (ii) one of the first topic and the second topic corresponding to the one of the first discussion state information having the first point in time prior to the operation point in time and the second discussion state information having the second point in time prior to the operation point in time.

4. The discussion support apparatus according to claim 3, wherein the processor controls the memory and the user interface.

5. The discussion support apparatus according to claim 3, wherein the processor sequentially determines, in order based on the points in time corresponding to the plural pieces of discussion state information, whether the plural pieces of discussion state information indicate states of discussions on the topic, respectively, and updates the topic-related information when the result of the determining changes.

6. The discussion support apparatus according to claim 3, further comprising:

a related-screen display unit, wherein the processor updates the topic-related information in response to a request from a user received by the user interface, wherein after the user interface accepts the discussion start operation, the processor controls the related-screen display unit to display a screen related to any of the plural pieces of discussion state information that are different from the first discussion state information and the second discussion state information indicated by the topic-related information at points in time before the operation point in time when the user interface accepts the discussion start operation, and wherein the processor updates the topic-related information in response to a request from the user received by the user interface which is accepted after the related-screen display unit displays the screen related to any of the plural pieces of discussion state information, which are different from the first discussion state information and the second discussion state information indicated by the topic-related information at points in time before the operation point in time when the user interface accepts the discussion start operation.

7. The discussion support apparatus according to claim 3, wherein the processor calculates, based on each of the plural pieces of discussion state information, an index for each of the plural pieces of discussion state information, the index indicating a degree of association or a degree of dissociation between each of the plural pieces of discussion state information and the topic, and generates the topic-related information, based on the index for the plural pieces of discussion state information.

8. The discussion support apparatus according to claim 3, wherein the processor updates the topic-related information in response to a request from a user received by the user interface.

9. The discussion support apparatus according to claim 3, further comprising: a related-screen display unit, wherein after the user interface accepts the discussion start operation, the processor controls the related-screen display output unit to display a screen related to any of the plural pieces of discussion state information that are different from the first discussion state information and the second discussion state information indicated by the topic-related information at points in time before the operation point in time when the user interface accepts the discussion start operation.

10. The discussion support apparatus according to claim 9, wherein the screen displayed by the related-screen display unit is related to discussion state information at a latest point in time among the plural pieces of discussion state information, which are different from the first discussion state information and the second discussion state information indicated by the topic-related information at the points in time before the operation point in time when the user interface accepts the discussion start operation.

11. The discussion support apparatus according to claim 3, wherein when, before the user interface accepts the discussion start operation, the user interface accepts a second discussion start operation for another second topic different from the another topic, the processor generates second topic-related information indicating at least one of the first discussion state information and the second discussion state information which is related to the second another topic and included in a period of time from a second operation time when the user interface accepts the second discussion start operation to the operation time when the user interface accepts the discussion start operation.

12. The discussion support apparatus according to claim 3, wherein the processor generates the topic-related information indicating pieces of discussion state information that are adjacent to each other in terms of order based on points in time corresponding thereto.

* * * * *